United States Patent
Chamley et al.

(10) Patent No.: US 10,121,392 B2
(45) Date of Patent: *Nov. 6, 2018

(54) MASKING AND UNMASKING METHODS AND DEVICES

(71) Applicant: OBERTHUR TECHNOLOGIES, Colombes (FR)

(72) Inventors: Olivier Chamley, Colombes (FR); Christophe Giraud, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,973

(22) Filed: Feb. 23, 2017

(65) Prior Publication Data

US 2017/0162080 A1   Jun. 8, 2017

Related U.S. Application Data

(63) Continuation of application No. 14/505,762, filed on Oct. 3, 2014, now Pat. No. 9,646,516.

(30) Foreign Application Priority Data

Oct. 9, 2013   (FR) ..................................... 13 59803

(51) Int. Cl.
*G09C 1/00*   (2006.01)
*G06F 21/60*   (2013.01)
(Continued)

(52) U.S. Cl.
CPC ............. *G09C 1/00* (2013.01); *G06F 21/602* (2013.01); *G06F 21/79* (2013.01); *H04L 9/0631* (2013.01); *H04L 2209/04* (2013.01)

(58) Field of Classification Search
CPC ......... G06F 21/34; G06F 21/602; G09C 1/00; G09C 1/02
See application file for complete search history.

(56) References Cited

U.S. PATENT DOCUMENTS 9,124,573 B2   9/2015   Chastain et al.
2006/0050887 A1   3/2006   Chen
(Continued)

FOREIGN PATENT DOCUMENTS

WO   2006051522   5/2006

OTHER PUBLICATIONS

Doomum et al., "AES-CBC Software Execution Optimization", Aug. 15, 2012, https://arxiv.org/ftp/arxiv/papers/1208/1208.3227. pdf, 8 pages.

(Continued)

*Primary Examiner* — Izunna Okeke
*Assistant Examiner* — Hee K Song
(74) *Attorney, Agent, or Firm* — Young & Thompson

(57) ABSTRACT

Devices and methods for masking and unmasking sensitive data, based on a standard cryptographic algorithm defining a ciphering algorithm, and a deciphering algorithm using more resources than the ciphering algorithm are described. The masking of sensitive data is done by applying the deciphering algorithm to the sensitive data to obtain masked sensitive data. The unmasking of the masked sensitive data is done by applying the ciphering algorithm to the masked sensitive data to obtain sensitive data in plain form.

18 Claims, 4 Drawing Sheets

(51) Int. Cl.
*G06F 21/79* (2013.01)
*H04L 9/06* (2006.01)

(56) References Cited

U.S. PATENT DOCUMENTS

| | | |
|---|---|---|
| 2008/0019524 A1 | 1/2008 | Kim et al. |
| 2008/0240426 A1 | 10/2008 | Gueron et al. |
| 2011/0231673 A1 | 9/2011 | Alekseev et al. |
| 2011/0321120 A1 | 12/2011 | Saxena et al. |
| 2012/0036571 A1 | 2/2012 | Yoo |
| 2013/0054474 A1 | 2/2013 | Yeager |
| 2013/0152208 A1 | 6/2013 | King et al. |
| 2013/0219180 A1 | 8/2013 | Saino et al. |
| 2013/0294602 A1* | 11/2013 | Huxham ............. H04L 63/0428 380/255 |
| 2014/0006797 A1 | 1/2014 | Cordella et al. |
| 2014/0169553 A1 | 6/2014 | Chen et al. |
| 2014/0365781 A1 | 12/2014 | Dmitrienko et al. |
| 2016/0012237 A1 | 1/2016 | Eftekhari et al. |

OTHER PUBLICATIONS

Jace H. Hall, "C Implementation of Cryptographic Algorithms", Jul. 2013, 28 pages, http://www.ti.com/lit/an/slaa547a/slaa547a.pdf, Jul. 2013, 28 pages.
FR Search Report, dated Jul. 11, 2014, from corresponding FR application.

* cited by examiner

MASKING AND UNMASKING METHODS AND DEVICES

This application claims priority of the French application FR No. 1359803 filed Oct. 9, 2013, which application is incorporated by reference into the present application.

FIELD OF THE INVENTION

The invention relates to security provision for sensitive data in an electronic device.

It is applicable, in particular, to the masking and unmasking of sensitive data in a device with limited resources.

BACKGROUND OF THE INVENTION

Current electronic devices employ more and more resources to implement multiple applications requiring a satisfactory level of security, such as payment applications for example.

To do this, sensitive applications and data are generally stored in masked form and they must be unmasked to be used.

Thus, the masked data must be unmasked prior to each time they are used, since to maintain their security they are not stored in plain form in the electronic device.

Additionally, in the case where the masked data represent instructions for implementing an application, the number of bits to be unmasked prior to the execution of this application in the electronic device is sometimes very large. Thus, the unmasking can be tedious in itself.

The expression "data in masked form" means that the data are not in plain form, in other words that they are concealed or hidden, i.e. unusable in their present state.

Conversely, the expression "unmasked data" means that the data are in plain form and that they can be executed, processed or used in their present state.

These unmasked data are vulnerable to a spying device for example, which is why they are generally not stored in this form in electronic devices.

Generally, data can be masked using a cryptographic algorithm defining an algorithm for ciphering these data. Correspondingly, masked data can be unmasked using a cryptographic algorithm defining an algorithm for deciphering these masked data.

Thus, such ciphering and deciphering algorithms are generally designed so as to be used jointly, typically to mask and unmask data, within one and the same cryptographic algorithm.

In particular, standard cryptographic algorithms exist that define the respective roles of the ciphering and deciphering algorithms. Among the standard cryptographic algorithms currently used in electronic devices, block cipher algorithms are particularly well known, such as for example the AES (Advanced Encryption Standard) defined in the ISO/IEC 18033-3 standard, section 5.2.

Although it is a symmetric algorithm (the deciphering consists in inverting the ciphering operations), the AES exhibits the peculiarity of using resources asymmetrically in the course of the ciphering and deciphering. Specifically, the ciphering takes less computing time than the deciphering.

In the context of electronic devices with limited memory, such as smart cards, the difference in performance between the ciphering and deciphering of data can be up to 30%.

The computing time due to these security operations is therefore considerable, particularly when the number of bits of the data to be unmasked is very large (e.g. an application) or else when the data are unmasked each time they are used.

SUMMARY OF THE INVENTION

The object of the present invention is thus to mitigate at least one of these drawbacks.

In this context, a first aspect of the invention relates to a method for masking sensitive data, based on a standard cryptographic algorithm defining a ciphering algorithm, and a deciphering algorithm using more resources than the ciphering algorithm, said method being characterized in that it comprises a step of masking the sensitive data by applying the deciphering algorithm to said sensitive data to obtain masked sensitive data.

A second aspect of the invention relates to a method for unmasking masked sensitive data, based on a standard cryptographic algorithm defining a ciphering algorithm, and a deciphering algorithm using more resources than the ciphering algorithm, said method being characterized in that it comprises a step of unmasking masked sensitive data by applying the ciphering algorithm to the masked sensitive data to obtain sensitive data in plain form.

Thus, the computing time due to security operations is optimized with respect to the prior art.

This is due to the fact that the access to masked sensitive data, i.e. the unmasking to obtain sensitive data in plain form, relies on the implementation of an algorithm using fewer resources than that used for masking the data.

Thus, the existing asymmetry of resource use between the ciphering and deciphering is exploited in order to reduce the overall time of resource use, due to security operations such as masking and unmasking (i.e. access to the masked data in plain form), while taking account of the fact that the data to be unmasked are sometimes very bulky, and that, most of the time, these data are often generally masked only once whereas they are unmasked each time they are used, i.e. many times.

Correspondingly, the invention relates to a device for masking sensitive data, based on a standard cryptographic algorithm defining a ciphering algorithm, and a deciphering algorithm using more resources than the ciphering algorithm, said device being characterized in that it comprises a module for masking sensitive data by applying the deciphering algorithm to said sensitive data to obtain masked sensitive data.

The invention also relates to a device for unmasking masked sensitive data, based on a standard cryptographic algorithm defining a ciphering algorithm, and a deciphering algorithm using more resources than the ciphering algorithm, said device being characterized in that it comprises a module for unmasking masked sensitive data by applying the ciphering algorithm to the masked sensitive data to obtain sensitive data in plain form.

The devices exhibit similar advantages to the methods they implement.

Other features of the methods and devices according to embodiments of the invention are described in the dependent claims.

According to a particular embodiment, the unmasking step is triggered upon receipt of a request comprising an APDU command compliant with the ISO 7816 standard, such that a response to said request is based on said sensitive data in plain form.

The sensitive data in plain form can be an authentication key.

The standard ciphering algorithm can be implemented by a cryptoprocessor, on the basis of the masked sensitive data and a key K.

According to a particular embodiment, the unmasking method comprises a step of applying a key stretching algorithm to a key K, to obtain a sub-key K″ required as input to the step of masking with the deciphering algorithm.

This step of applying a key stretching algorithm turns out to be particularly costly in terms of computing time.

According to a particular embodiment, the unmasking method is such that the unmasking with the ciphering algorithm comprises at least one instance of access to a table stored in a memory and the masking method is such that the masking with the deciphering algorithm comprises a plurality of instances of access to this same table stored in a memory.

According to a particular feature of this embodiment, the number of instances of access to the table when unmasking with the ciphering algorithm is less than the number of instances of access to this same table anticipated in the deciphering algorithm.

According to the invention, the ciphering algorithm uses fewer resources than the corresponding deciphering algorithm usually used to unmask data.

Usually, two tables of 256 octets are used in the implementation of the ciphering algorithm, whereas four other tables of 256 octets are needed for implementing the corresponding deciphering algorithm.

In the case of a device with limited memory, it is possible to use only three tables of 256 octets for the ciphering and deciphering, which allows a saving of 768 octets of memory. However, the implementation of the deciphering requires additional operations, notably a much larger number of instances of access to these tables, thereby considerably lengthening the computing time of the deciphering.

In the case of very bulky data, and/or in the case where the data are only masked once, it is not inconvenient to extend the computing time when applying the deciphering algorithm and to unmask these data by applying the corresponding ciphering algorithm, which is much less costly in terms of computing power.

According to a particular embodiment, the unmasking method comprises a plurality of instances of access to masked sensitive data, each instance of access comprising a step of unmasking by applying the ciphering algorithm to the masked sensitive data to obtain sensitive data in plain form.

Thus, the invention is particularly beneficial in the case where the sensitive data are used (and therefore unmasked) many times.

A third aspect of the invention relates to a method for personalizing an electronic device, characterized in that it comprises the following steps:
obtaining sensitive data by means of a third-party device,
masking the obtained sensitive data by means of the third-party device, using the masking method as aforementioned; and
storing the obtained masked sensitive data in the electronic device, so as to personalize the electronic device.

A fourth aspect of the invention relates to a method for authenticating an electronic device storing masked sensitive data in a memory, said method being characterized in that it comprises the following steps:
unmasking the masked sensitive data stored in the memory of the electronic device using the unmasking method as aforementioned, so as to obtain sensitive data in plain form; and
authenticating the electronic device to a third-party device using the obtained sensitive data in plain form.

According to some embodiments, the masked sensitive data are unmasked using the standard AES deciphering algorithm to obtain a ciphering key in plain form, said ciphering key being used to cipher a challenge of a challenge-response authentication.

According to some embodiments of the invention, the aforementioned methods use a standard cryptographic algorithm compliant with the AES standard.

According to some embodiments, the sensitive data include instructions for implementing an application.

The number of octets to be unmasked can then be considerable, hence the interest in optimizing the unmasking of the application in relation to the masking.

In some modes, this application is capable of communicating remotely with an external electronic entity.

Typically, this entity can be a payment application, or else an authentication application or more conventionally a mobile telephony application. Generally speaking, the devices according to the invention can also include features corresponding to the embodiments envisaged above for the methods.

According to some embodiments, the aforementioned unmasking device can moreover comprise a module for unmasking other masked data, by applying the deciphering algorithm to these other masked data to obtain other data in plain form.

According to some embodiments, the aforementioned masking device can moreover comprise a module for masking other data, by applying the ciphering algorithm to these other data to obtain other data in plain form.

These two provisions allow a user to choose between a conventional masking or unmasking, i.e. using a ciphering or deciphering algorithm respectively, and an "inverse" masking, according to the data to be processed (for example according to their frequency of use) without having recourse to different devices.

The invention thus also deals with a computer program on an information storage medium, comprising instructions for implementing one of the aforementioned methods, when it is loaded and executed by a processor.

This program can use any programming language, and be in the form of source code, object code, or intermediate code between source code and object code, such as in a partly compiled form, or in any other form desired.

The invention also deals with an information storage medium that is readable by a computer, and comprising instructions of a computer program as mentioned above.

The information storage medium can be any entity or device capable of storing the program. For example, the storage medium can comprise a storage means, such as a ROM, for example a CD ROM or a microelectronic circuit ROM, or else a magnetic recording means, for example a diskette (floppy disk), a hard disk, or else a flash memory.

In addition, the information storage medium can be a transmissible storage medium such as an electrical or optical signal, which can be routed via an electrical or optical cable, by radio or by other means. The program according to the invention can in particular be downloaded to a storage platform from a network of Internet type.

Alternatively, the information storage medium can be an integrated circuit in which the program is incorporated, the circuit being adapted to execute or to be used in the execution of the method in question.

The aforementioned information storage medium and computer program exhibit features and advantages analogous to the methods they implement.

BRIEF DESCRIPTION OF THE FIGURES

Other peculiarities and advantages of the invention will become further apparent in the description hereinbelow, illustrated by the attached figures which illustrate exemplary embodiments thereof that are devoid of any limiting feature. In the figures.

DETAILED DESCRIPTION OF THE INVENTION

Figure 1:
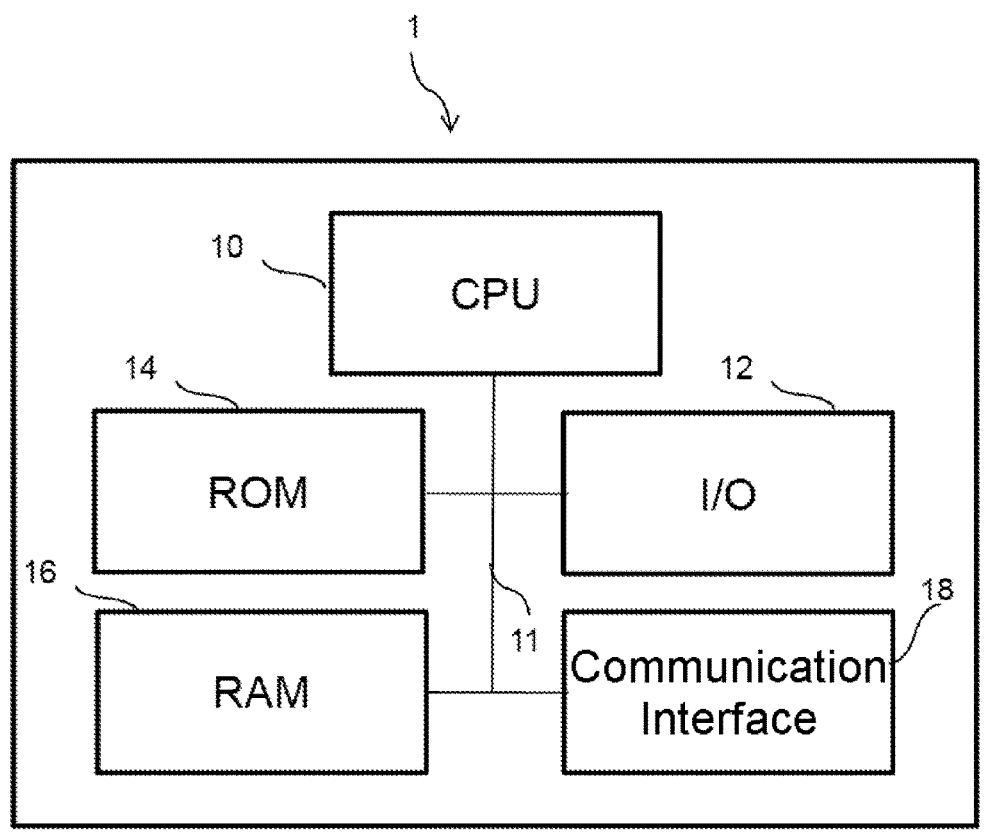
FIG. 1 illustrates an example of a hardware architecture for an electronic device according to the invention.

FIG. 1 represents an electronic device 1, suitable for implementing the main steps of a method for masking sensitive data and/or unmasking, and/or personalizing, and/or authenticating according to the invention, as described below with reference to FIG. 2, 3 or 4.

Generally, the invention relates to security provision for accessing sensitive data, i.e. the unmasking of these sensitive data when they are "hidden", to obtain these sensitive data in plain form, for example a masked ciphering key or instructions for implementing an application loaded then masked on the electronic device 1 by a user of this device or else by an external entity, not represented, for example controlled by an operator (for example in the course of a personalization method).

Such a device can for example be a SIM card, or a secure element, for example inserted into a terminal (e.g. a mobile phone, a tablet, or a portable computer).

Returning to FIG. 1, the device 1 comprises a communications bus 11 to which are connected:
- a processing unit 10—or microprocessor—denoted CPU (Central Processing Unit);
- one or more non-volatile memories 14, for example ROM (Read Only Memory), that can form a storage medium in the sense of the invention, i.e. that can comprise a computer program comprising instructions for implementing the methods according to the invention; this non-volatile memory can also be an EEPROM (Electrically Erasable Read Only Memory) or else a flash memory;
- a random access memory 16, cache memory or volatile memory, for example RAM (Random Access Memory), comprising registers suitable for the storage of the variables and parameters created and modified in the course of the execution of the aforementioned program; during the implementation of the invention. The instruction codes of the program stored in the non-volatile memory (e.g. EEPROM or flash) are loaded into the RAM for the purpose of being executed by the processing unit CPU;
- a communication interface 18 suitable for transmitting and receiving data, for example via a telecommunications network or a read/write interface. It is by means of this interface, for example, that an operator can trigger the loading of the sensitive data onto the device.

Optionally, when the device 1 is inserted into a host terminal, the latter can comprise an I/O (Input/Output) interface 12, for example a screen, a keyboard, a mouse or any other pointing device, such as a touch-sensitive screen or a remote control, for example allowing a user of the terminal to create a request to access sensitive data loaded and masked on the device.

In a variant, this request can be generated by the host terminal itself or else by a third-party device.

In a particular embodiment, the device comprises a cryptoprocessor receiving instructions on behalf of the processing unit 10 to cipher and/or decipher data.

For example, the cryptoprocessor can be composed of two buffers controlled by the processing unit CPU, namely, one buffer receiving as input a cryptographic (or ciphering/deciphering) key and one so-called work buffer receiving as input the sensitive data in plain form to be masked or the masked sensitive data to be unmasked with the aforementioned key.

The communications bus allows the communication and interoperability between the various elements included in the device 1 or connected thereto. The representation of the bus is not limiting and, notably, the processing unit is able to communicate instructions to any element of the device directly or by way of another element of this device.

According to a particular embodiment of the invention, the device 1 comprises masked sensitive data in a memory, preferably a non-volatile memory 14. These sensitive data (e.g. instructions for implementing an application by means of the device or else the cryptographic or authentication keys) can have been loaded onto the device 1 by a user of the device. In a variant, these sensitive data have been introduced into the device in the course of a personalization process, for example by the supplier of the device.

Figure 2:
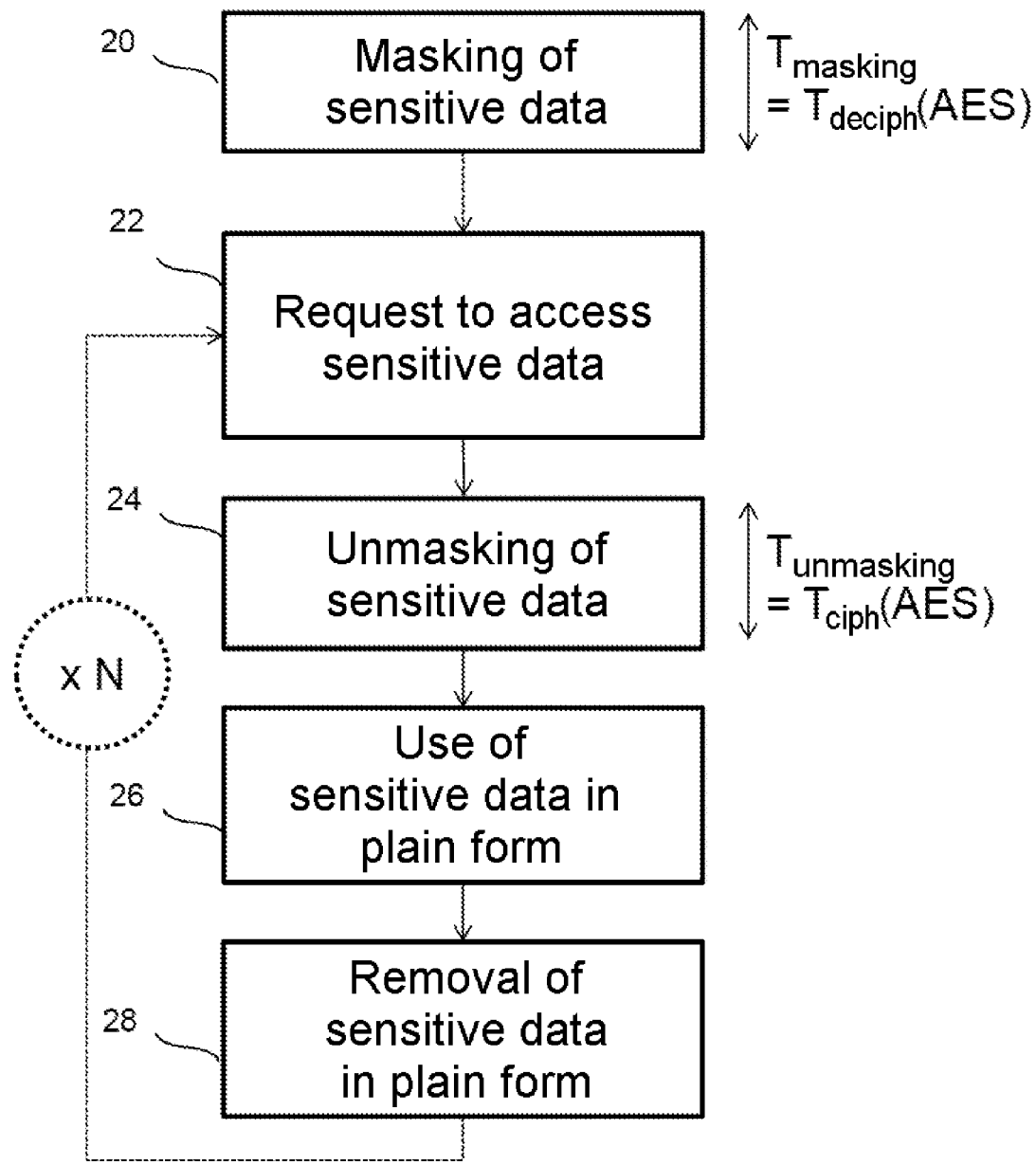
FIG. 2 illustrates the general principle of the invention.

In both cases, and as illustrated in FIG. 2, these sensitive data are stored in the memory in masked form, after having been masked (20) for example via the implementation of a masking method according to the invention, as described below in detail with reference to FIG. 3.

Upon each request to use or access these sensitive data (22), a method for unmasking these sensitive data is implemented. Note that, for security reasons, the sensitive data are not spontaneously made available (i.e. unmasked) by the device 1. In other words, the unmasking is done only on request.

In particular, this request can take the form of an APDU command compliant with the ISO 7816 (ETSI 11.11) standard, for example formulated by a user via the I/O interface of a host terminal into which the device 1 is inserted. For example, this request can be a request for authentication of the device 1 to the host terminal.

The receipt of this request leads to the implementation, in the device that receives it, of a command using the sensitive data in plain form, for example to generate a response to this request. To do this, the masked sensitive data must therefore be unmasked.

The receipt of such an APDU request triggers their unmasking.

A method for unmasking the masked sensitive data, compliant with the invention, as described below in detail with reference to FIG. 4, uses an algorithm employing fewer resources than in the prior art.

The algorithm making it possible to access the sensitive data in plain form (i.e. unmasking them) employs the resource (e.g. the random access memory 16) for a shorter duration than in the prior art.

In the text below, the following notation will be used:

$T_{ciph}$, for the duration of a masking operation of the prior art (i.e. ciphering), $T_{deciph}$ for the duration of an unmasking operation of the prior art (i.e. deciphering), $T_{masking}$ for the duration of a masking operation according to the invention, $T_{unmasking}$ for the duration of an unmasking operation according to the invention.

In particular, according to the invention, the duration of the unmasking $T_{unmasking}$ (=$T_{ciph}$) is not as long as the duration of the masking $T_{masking}$ (=$T_{deciph}$) of the sensitive data to which access is desired. In other words, $T_{unmasking} < T_{masking}$, whereas in the prior art, $T_{deciph} > T_{ciph}$.

Once unmasked by the device, the sensitive data in plain form are used (26), for example to generate a response to the request received in step 22.

After use, the sensitive data in plain form are removed (28) by the device 1 in order not to endanger their security.

The invention thus allows optimized management of resources in real time, notably when the data are very bulky, for example when they correspond to an application, and/or when the sensitive data are accessed repeatedly (N times, with N very much larger than 1, see return loop in dotted lines).

Thus, generally speaking, the computing time and the resources implemented in the context of security operations are optimized with respect to the prior art, while guaranteeing a satisfactory level of security for sensitive data.

According to a preferred embodiment, the algorithms applied are compliant with the AES standard (Advanced Encryption Standard).

In particular, the invention uses the fact that the ciphering and deciphering algorithms according to this standard exhibit an equivalent level of security; however, AES ciphering is discovered to be less resource-hungry than AES deciphering, in other words $T_{ciph}(AES) < T_{deciph}(AES)$.

This is why the inventors propose to use the steps of the deciphering algorithm according to the AES standard (higher computing cost than AES ciphering) to mask the sensitive data and to secure access to (i.e. unmask) the sensitive data thus masked by applying, at each access request, the steps of the reverse algorithm, namely the ciphering algorithm according to the AES standard (lower computing cost than AES deciphering).

Thus, one and the same device can both mask sensitive data using the deciphering algorithm (for example AES deciphering) and mask other data using the ciphering algorithm in the conventional way (for example AES ciphering).

Symmetrically, one and the same device can both unmask masked sensitive data using the ciphering algorithm (for example AES ciphering) and unmask other masked data using the deciphering algorithm in the conventional way (for example AES deciphering).

Figure 3:
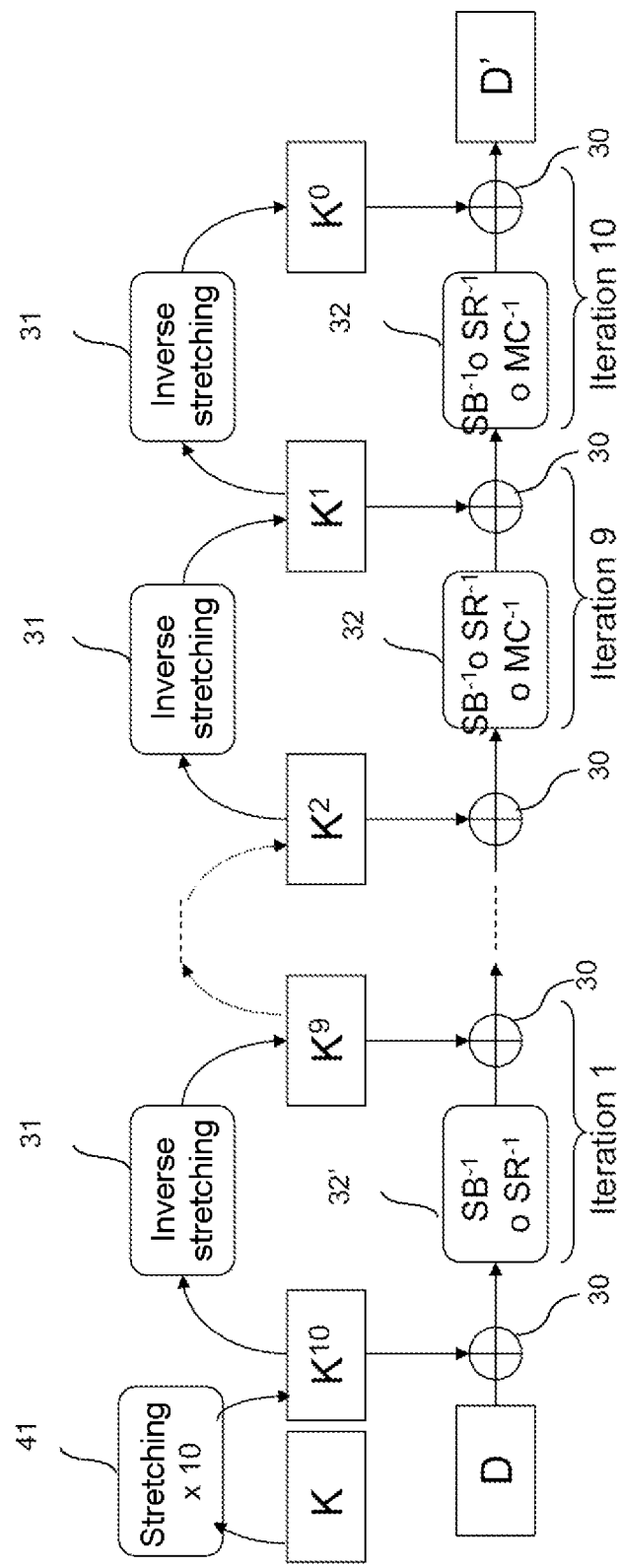
FIG. 3 illustrates the main steps of a masking method according to a particular embodiment of the invention.
Figure 4:
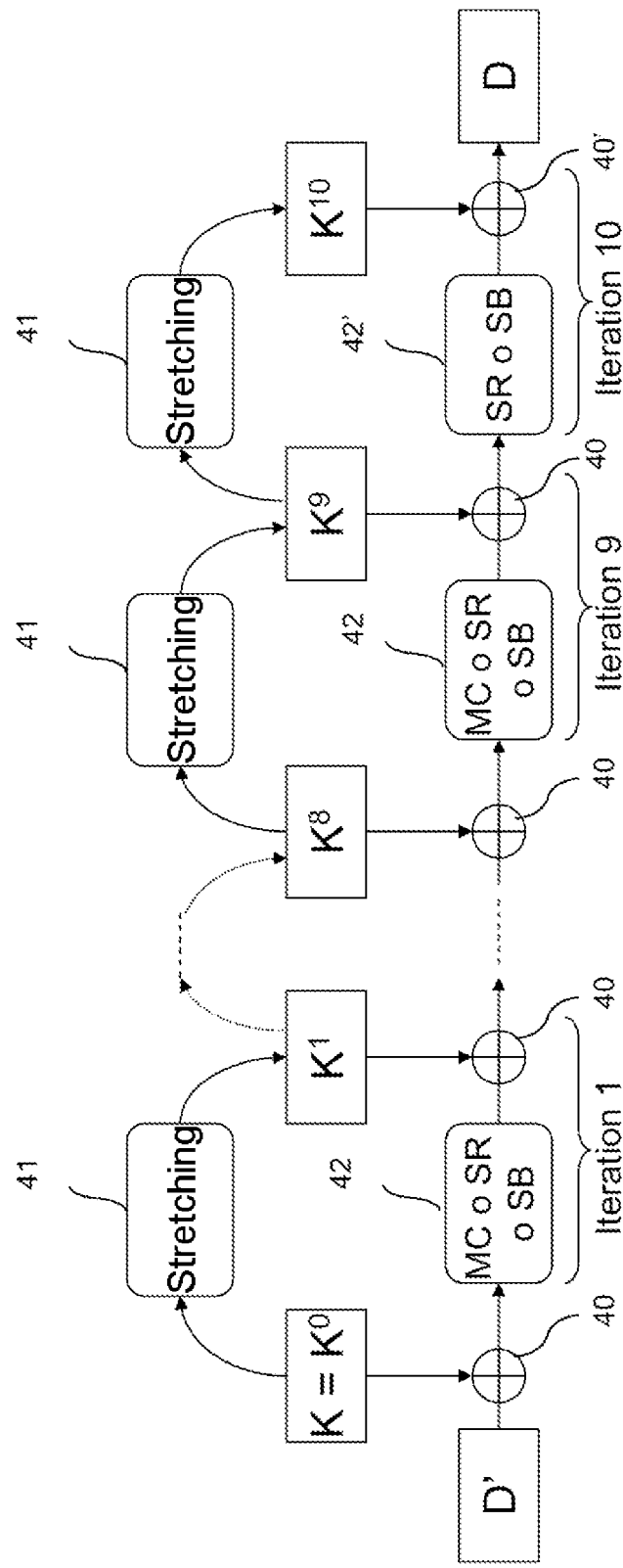
FIG. 4 illustrates the main steps of an unmasking method according to a particular embodiment of the invention.

FIGS. 3 and 4 illustrate the main steps of the masking and unmasking methods according to the invention, based on the AES standard for example.

The method of FIG. 3 can be performed in the device in FIG. 1 or else in an external entity (not represented) and the result can be stored in the memory of the device in FIG. 1, in the course of a step of personalizing the device for example.

This method performs the masking of the sensitive data D by applying the steps of the block deciphering algorithm according to the AES standard.

Generally, the AES standard defines the symmetrical ciphering and deciphering algorithms, based on one and the same cryptographic key K.

Thus, a cryptographic key K is stored in the memory of the device, for example in a non-volatile memory.

The size of the key used depends on the level of security desired. Indeed, the more bits are included in the key, the more complicated it will be to use and the safer the data to be masked with this key will be.

In the AES standard, the key used can be a key of 128 bits, 192 bits or else 256 bits. In the example in FIG. 3, a key of 128 bits is used. In the course of a step 41, a procedure of key stretching (or derivation) is applied to the key K. This procedure makes it possible to obtain a set of sub-keys $K^0$, $K^1$, ... $K^n$ linked pair-wise.

In other words, the application of a stretching algorithm to the key $K=K^0$ makes it possible to obtain $K^1$, then the application of this same stretching algorithm to the sub-key thus obtained $K^1$ makes it possible to obtain the sub-key $K^2$, and so on until the sub-key $K^{10}$ is obtained by ten successive applications of the stretching algorithm to the initial key K.

Of course, the invention is not limited to this precise number of sub-keys. For example, according to the AES standard, a stretching procedure for a key of 192 bits makes it possible to obtain 12 sub-keys and a stretching procedure for a key of 256 bits makes it possible to obtain 14 sub-keys. Thus, the number of laps or round trips of the stretching algorithm is linked to the number of sub-keys.

The obtaining of these sub-keys can be performed using known techniques that will not be described in detail here. It should be noted that the procedure for obtaining these sub-keys involves heavy employment of resources. In particular, the larger the key, the longer the duration of this procedure.

It should be noted that the AES standard is particularly suitable for devices with limited resources since only the key K is stored in the read-only memory, the successive sub-keys being overwritten step-by-step by the value of the following sub-key, for example in the random access memory.

The storing in the memory of a sub-key, for example $K^{10}$, would thus be pointless since the AES standard does not make any provision for using different keys (i.e. a key K, a sub-key $K^n$) as input to the ciphering and deciphering algorithms.

The masking method according to the invention continues with an initial transform (30) consisting in applying the last sub-key obtained (here $K^{10}$) to the sensitive data D in the form of a block of bits, by means of an exclusive OR operator: $D \oplus K^{10}$, the symbol $\oplus$ designating the exclusive OR or XOR operator.

Following this initial transform, a first iteration or round trip (Iteration 1) is implemented. This particular iteration comprises a step 32' of:

inverse transposition $SR^{-1}$ (for Inverse ShiftRows) of the initially transformed sensitive data ($D \oplus K^{10}$); the block obtained is then written $SR^{-1}(D \oplus K^{10})$; and substitution $SB^{-1}$ (for Inverse SubBytes) of the bits of the block thus obtained by other bits, using several pre-stored tables; the obtained block is then written $SB^{-1} \circ SR^{-1}(D \oplus K^{10})$, where the symbol $\circ$ denotes the composition of functions (here $SB^{-1} \circ SR^{-1} = SB^{-1}(SR^{-1})$).

Generally, the steps of inverse transposition and substitution are interchangeable ($SB^{-1} \circ SR^{-1} = SR^{-1} \circ SB^{-1}$) and make it possible to arrive at the same result.

This first iteration also comprises a transform 30 consisting in applying the sub-key before last (here $K^9$) obtained by the application to the sub-key $K^{10}$ of an inverse stretching algorithm (31) making it possible to obtain $K^{i-1}$ step-by-step from $K^i$.

In the text below, a succession of iterations (iterations 2 to 10) comprising a step 32 (described below) and a transform 30 with the preceding sub-key, is implemented.

In particular, the step 32 is similar to the step 32' of the initial iteration, with the difference that the step 32 comprises, before the aforementioned inverse transposition $SR^{-1}$ and substitution $SB^{-1}$, a multiplication $MC^{-1}$ (for Inverse MixColumns) of sub-blocks of the block obtained in the preceding iteration (namely for the second iteration: $SB^{-1} \circ SR^{-1}$ ($D \oplus K^{10}$)) by a matrix. Thus, the step 32 comprises the application of the following operations: $SB^{-1} \circ SR^{-1} \circ MC^{-1}$ to the result of the previous iteration.

The iterations stop following the final transform based on the key $K^0=K$. The sensitive data thus masked D' are therefore the result of a set of iterations as described previously, compliant with the steps of a deciphering algorithm according to the AES standard.

These masked sensitive data D' are then stored in the memory of the device, either directly at the request of a user or in the course of a phase of personalization by an operator or constructor of the device.

In practice, the masking of the sensitive data is performed by a cryptoprocessor controlled by the processing unit CPU. This cryptoprocessor operates according to a predetermined logic and accepts as input only the sensitive data D and a key K, compliant with the AES standard.

A non-limiting example of instructions sent by the processing unit CPU to the cryptoprocessor so that it implements the masking in FIG. 3 is given below:

Activate AES co-processor//activation of the cryptoprocessor

Load 128-bit ciphertext//provision of the sensitive data to be masked

Load 128-bit AES key//provision of the cryptographic key K

Execute decryption//command to launch the AES deciphering to mask the sensitive data with the key K Poll co-processor until decryption terminated//AES deciphering Read 128-bit plaintext//obtaining of the masked sensitive data In a particular embodiment, the processing unit CPU is configured for controlling the cryptoprocessor according to the frequency of use of the data.

For example, when they are data used occasionally, the CPU can control masking of these data by the conventional route, i.e. by applying the AES ciphering algorithm, since the unmasking will only be occasional.

When they are very frequently used data, the CPU can control masking of these critical data with the AES deciphering algorithm, in the aim of reducing the total computing cost due to the many unmaskings that these data will undergo. The method in FIG. 4 can be implemented by the device in FIG. 1.

This method secures the accessing of masked sensitive data D', for example those obtained in FIG. 3, by applying the steps of the block ciphering algorithm according to the AES standard.

As described previously, this method makes it possible to access the sensitive data in plain form D since these data were masked by applying the block deciphering algorithm according to the AES standard, which happens to be the inverse algorithm of that used according to the invention for unmasking (i.e. accessing in a secure way) the sensitive data in plain form D.

Thus, starting from the masked sensitive data D', and the key K stored for example in the read-only memory of the device, an initial transform (40) is carried out consisting in applying the key $K=K^0$ to the masked data D' (in the form of a block of bits), by means of an exclusive OR operator: $D' \oplus K^0$.

Following this initial transform, a series of iterations (Iterations 1 to 9) is implemented, each iteration comprising a step 42 of:

substituting SB (SubBytes) the bits of the block obtained in the preceding iteration ($D' \oplus K^0$ for the first iteration) with other bits, using at least one pre-stored table;

transposing SR (ShiftRows) the block obtained; and multiplying MC (MixColumns) sub-blocks of the block obtained by a matrix equivalent to the inverse of the matrix used for the operation $MC^{-1}$ when the data D are ciphered.

The last iteration does not comprise any multiplication MC and, after the application of $SR \circ SB$ and then of the final transform by the last sub-key, here $K^{10}$, leads to the sensitive data in plain form D.

Generally, the transposing and substituting steps are interchangeable ($SB \circ SR = SR \circ SB$) and make it possible to arrive at the same result.

Of course, the accessing (unmasking) of the sensitive data is only possible to the extent that the tables and functions used for their masking (see description in FIG. 3) correspond to the inverses of the tables and functions used for the present unmasking of these data.

In a manner known to those skilled in the art, the inverse functions involved in the masking method according to the invention turn out to be far more laborious to use than the corresponding functions used conventionally for AES ciphering.

Indeed, the substitution operation in the ciphering algorithm according to AES consists in applying a non-linear function to the data. As this function is difficult to invert, the deciphering algorithm according to AES is consequently more expensive in computing terms.

In addition, the operation of multiplication (in the context of the ciphering according to AES) generally relies on multiplications by 2, whereas the inverse multiplication operation (deciphering according to AES) involves a larger number of elementary operations and tables.

By way of non-limiting example, let us consider the case where the multiplication pertains to a block composed of 4 'a' columns of 4 bits a[0], a[1], a[2] and a[3]. This multiplication uses an 'xtime' table of 216 octets making it possible to return double the amount of the column in the body used by AES, well known to those skilled in the art.

According to AES, the instructions represented below are executed four times in succession for each of the a columns:

$Tmp=a[0] \oplus a[1] \oplus a[2] \oplus a[3];$ $Tm=a[0] \oplus a[1];$ $Tm=xtime(Tm);$ $a[0]=a[0] \oplus Tm \oplus Tmp;$ $Tm=a[1] \oplus a[2];$ $Tm=xtime(Tm);$ $a[1]=a[1] \oplus Tm \oplus Tmp;$ $Tm=a[2] \oplus a[3];$ $Tm=x\text{time}(Tm);$ $a[2]=a[2] \oplus Tm \oplus Tmp;$ $Tm=a[3] \oplus a[0];$ $Tm=x\text{time}(Tm);$ $a[3]=a[3] \oplus Tm \oplus Tmp;$ The computing cost of the multiplication of a single column is therefore 15 XORs and 4 instances of access to the 'xtime' table and the cost of the multiplication for the entire block is four times this cost per column: $C_{tot}=4*(15*C_\oplus+4*C_{xtime})$ Conversely, let us consider the inverse multiplication of this same block of 4×4 bits. To do this, the same 'xtime' table is used so as to limit the required occupation of memory, at the expense of the computing cost, as can be seen in the following.

According to AES, the instructions shown below are executed four times in succession for each of the 'a' columns of 4 bits:

$Tmp1=a[0] \oplus a[1] \oplus a[2] \oplus a[3];$ $Tmp2=x\text{time}(Tmp1);$ $a[3]=x\text{time}(x\text{time}(Tmp2 \oplus a[1] \oplus a[3]) \oplus a[3] \oplus a[0]) \oplus Tmp1 \oplus a[3];$ $a[2]=x\text{time}(x\text{time}(Tmp2 \oplus a[0] \oplus a[2]) \oplus a[2] \oplus a[3]) \oplus Tmp1 \oplus a[2];$ $a[1]=x\text{time}(x\text{time}(Tmp2 \oplus a[3] \oplus a[1]) \oplus a[1] \oplus a[2]) \oplus Tmp1 \oplus a[1];$ $a[0]=x\text{time}(x\text{time}(Tmp2 \oplus a[2] \oplus a[0]) \oplus a[0] \oplus a[1]) \oplus Tmp1 \oplus a[0];$ The cost of the inverse multiplication of a single column is therefore 27 XORs and 9 instances of access to the 'xtime' table and the cost of the multiplication for the entire block is four times this cost per column: $C'_{tot}=4*(27*C_\oplus+9*C_{xtime})$.

Thus, the operation of inverse multiplication (in the context of the AES deciphering) is much more expensive in computational terms than the multiplication (in the context of the AES ciphering).

This is why the inventors propose to use the deciphering according to AES to mask the data, since the data are in theory masked only once. Correspondingly, ciphering according to AES (faster than deciphering) is used to unmask these data, each time that the user or an external entity asks to use said data.

This inversion of the AES algorithms is, however, made possible because these algorithms are complementary by virtue of their (standard) construction. It is therefore possible to retrieve sensitive data using the cryptographic key K when they have been masked according to the AES deciphering algorithm using this same key.

Thus, the methods according to the invention make it possible to secure sensitive data without having to store them in a secure memory. These sensitive data can for example be:

applications, a ciphering key used in the course of a step of ciphering and/or of deciphering data, authentication data used in the course of an authentication step, for a user or for an electronic entity for example.

The invention also relates to a personalization method in the course of which sensitive data, typically authentication data or an application, are masked in one device (e.g. controlled by a network operator) according to a masking method according to the invention, then inserted in masked form into another device (for example a network identification card) or stored in the same device. Thus the device storing the authentication data is personalized.

Typically, a personalization operation can comprise the authentication of the device to be personalized to a third-party device; the latter can obtain the authentication data for the personalization, for example a ciphering key to be used in a challenge-response authentication.

The key can be generated from identification elements specific to the device to be personalized. The third-party device masks this key using the masking method according to the invention, for example using the deciphering algorithm as defined in the AES standard. The key thus masked is written into the ROM of the device to be personalized, in this way assuring said personalization of the device.

Finally, the personalized device can be locked from a security point of view, for example by the writing of a setting flag prohibiting any new writing in the memory area storing the masked key.

In a variant, this memory area can be of the type that is write-accessible a single time and readable many times, thus preventing write instance of access to the masked key once the personalization has been carried out.

In the context of authentication to a third-party entity, the personalized device may have to use these authentication data present in masked form in the memory. As described above, this is for example the case if this masked data item is a ciphering key required for a challenge-response authentication.

To do this, an unmasking method according to the findings of the invention can be applied to retrieve the authentication data, here the key, and use them to authenticate the other device to a third-party entity. Notably, the ciphering algorithm as defined in the AES standard can be used.

In practice, such an authentication can be done following an APDU command of Internal Authenticate type (compliant with the ISO 7816 standard) transmitted by the third-party entity to the personalized device and containing a challenge (for example a random data item).

The challenge-response authentication then comprises, on the personalized device, the unmasking of the masked key, the ciphering of the challenge using the unmasked key, for example based on the DES algorithm, then the result of this ciphering is returned to the third-party entity, in an APDU response to validate the authentication.

The preceding examples are only embodiments of the invention, which is not limited thereto.

The invention claimed is:

1. A method for personalizing an electronic device, comprising:
   obtaining sensitive data by way of a third-party device composed of a CPU, a memory having coded instructions stored therein for operating the CPU, and a communications bus in communication with the CPU;
   at the third-party device, obtaining a masking method selection input and masking the obtained sensitive data using a masking method based on a standard cryptographic algorithm defining a ciphering algorithm, and a deciphering algorithm that uses more resources than the ciphering algorithm, wherein the masking method to mask the obtained sensitive data is determined, based on the masking method selection input, from a first masking method masking the obtained sensitive data by applying the ciphering algorithm to said sensitive data to obtain masked sensitive data and a second masking method masking the sensitive data by applying the deciphering algorithm to said sensitive data to obtain masked sensitive data; and storing the masked sensitive data in the electronic device so as to personalize the electronic device, wherein the masking method selection input depends on a frequency of use of the sensitive data.

2. The method according to claim 1, further comprising: unmasking the masked sensitive data, wherein the unmasking applies the other algorithm between the deciphering and ciphering algorithms than the one applied by the masking method to the masked sensitive data to obtain sensitive data in plain form.

3. The method according to claim 2, wherein the electronic device is configured for also unmasking other masked data, by applying the ciphering or deciphering algorithm of the determined masking method to said other masked data to obtain said other data in plain form.

4. The method according to claim 2,
wherein an unmasking with the ciphering algorithm comprises at least one instance of access to a table stored in a memory, and
wherein the number of instances of access to the table when unmasking with the ciphering algorithm is less than the number of instances of access to this same table anticipated in the deciphering algorithm.

5. The method according to claim 2, wherein a plurality of instances of access to masked sensitive data is carried out, each instance of access comprising a step of unmasking by applying the other algorithm to the masked sensitive data to obtain sensitive data in plain form.

6. The method according to claim 2, wherein the unmasking step is triggered upon receipt of a request comprising an APDU command compliant with the ISO 7816 standard, such that a response to said request is based on said sensitive data in plain form.

7. The method according to claim 2, wherein the sensitive data in plain form are an authentication key.

8. The method according to claim 2, wherein the standard ciphering algorithm is implemented by a cryptoprocessor, on the basis of the masked sensitive data and a key K.

9. The method according to claim 1, wherein the electronic device is configured for also masking other data, by applying the other algorithm to these other data to obtain other data in plain form.

10. The method according to claim 1, further comprising: applying a key stretching algorithm to a key K, to obtain a sub-key K″ required as input to the step of masking with the ciphering or deciphering algorithm of the determined masking method.

11. The method according to claim 1, wherein the sensitive data are identification elements specific to the electronic device to be personalized.

12. The method according to claim 1, wherein the standard cryptographic algorithm is compliant with the AES standard.

13. The method according to claim 1, wherein the masking method selection input is a user input.

14. A system, comprising:
an electronic device to be personalized; and
a third-party device, incorporating a CPU, a memory and a communications bus in communication with the CPU, the memory having stored therein at least encoded instructions that, upon execution by the CPU, causes the third-party device to function as:
a module at the third-party device that obtains sensitive data,
a module at the third-party device that obtains a masking method selection input, and masks the obtained sensitive data by operatively implementing a masking method based on a standard cryptographic algorithm defining a ciphering algorithm, and a deciphering algorithm that uses more resources than the ciphering algorithm, by applying the deciphering algorithm to said sensitive data to obtain masked sensitive data,
the masking method to mask the obtained sensitive data being determined, based on the masking method selection input, from a first masking method masking the obtained sensitive data by applying the ciphering algorithm to said sensitive data to obtain masked sensitive data and a second masking method masking the sensitive data by applying the deciphering algorithm to said sensitive data to obtain masked sensitive data,
where the masking method selection input depends on a frequency of use of the sensitive data, and
a module that stores the obtained masked sensitive data in the electronic device, so as to personalize the electronic device.

15. The system according to claim 14, wherein the third-party device is configured to further function as:
a module that unmasks masked sensitive data by applying the other algorithm between the deciphering and ciphering algorithms than the one applied by the masking method to the masked sensitive data to obtain sensitive data in plain form.

16. The system according to claim 15, wherein the third-party device is configured to yet further function as:
a module that unmasks other masked data, by applying the ciphering or deciphering algorithm to these other masked data to obtain other data in plain form.

17. The system according to claim 14, wherein the third-party device is configured to further function as:
a module that masks other data, by applying the ciphering or deciphering algorithm to these other data to obtain other data in plain form.

18. The system according to claim 14,
wherein the sensitive data are identification elements specific to the electronic device to be personalized.

* * * * *